(12) United States Patent
Swiss et al.

(10) Patent No.: US 10,554,936 B2
(45) Date of Patent: Feb. 4, 2020

(54) SECURITY CAMERA

(71) Applicant: LIGHTCAM, INC., South Jordan, UT (US)

(72) Inventors: Daniel Swiss, South Jordan, UT (US); Bryson C. Hill, Mapleton, UT (US)

(73) Assignee: Lightcam, Inc., South Jordan, UT (US)

( * ) Notice: Subject to any disclaimer, the term of this patent is extended or adjusted under 35 U.S.C. 154(b) by 20 days.

(21) Appl. No.: 15/660,964

(22) Filed: Jul. 27, 2017

(65) Prior Publication Data

US 2018/0035084 A1 Feb. 1, 2018

Related U.S. Application Data

(60) Provisional application No. 62/368,980, filed on Jul. 29, 2016.

(51) Int. Cl.
*H04N 7/18* (2006.01)
*G08B 13/196* (2006.01)

(52) U.S. Cl.
CPC ......... *H04N 7/185* (2013.01); *G08B 13/1963* (2013.01); *G08B 13/19621* (2013.01); *G08B 13/19632* (2013.01); *G08B 13/19636* (2013.01)

(58) Field of Classification Search
CPC .......... H04N 7/18; H04N 7/183; G08B 25/10; G08B 13/1966; G08B 13/19; G08B 5/38; G08B 13/1963; G08B 13/19632; G08B 13/19621; G08B 13/19636
USPC ....................................................... 348/143
See application file for complete search history.

(56) References Cited

U.S. PATENT DOCUMENTS

| | | | |
|---|---|---|---|
| 4,205,895 A * | 6/1980 | Yurdin | ............... G03B 11/045 359/612 |
| D435,576 S | 12/2000 | McBride | |
| 7,688,195 B2 | 3/2010 | Yeh et al. | |
| 8,562,158 B2 | 10/2013 | Chien | |
| 9,053,622 B2 | 6/2015 | Scalisi | |
| D740,873 S | 10/2015 | Scalisi | |
| 9,165,444 B2 | 10/2015 | Scalisi | |
| 9,172,917 B1 | 10/2015 | Fu et al. | |
| 9,228,731 B2 | 1/2016 | Chen | |
| D749,161 S | 2/2016 | Scalisi | |

(Continued)

FOREIGN PATENT DOCUMENTS

| | | |
|---|---|---|
| DE | 10064098 A1 | 7/2002 |
| WO | 2015005510 A1 | 1/2015 |

OTHER PUBLICATIONS

Clinton, Say No to Conduit! Try Telescoping Camera Poles for Pendant Mount CCTV Cameras, Mar. 11, 2015, Clinton Electronics, https://clintonelectronic.com/say-no-conduit-telescoping-camera-poles/ (Year: 2015).*

(Continued)

*Primary Examiner* — Marnie A Matt
(74) *Attorney, Agent, or Firm* — Stoel Rives LLP; R. Whitney Johnson; Jeremy B. Barton

(57) ABSTRACT

A security device is disclosed herein, comprised of a body having a first end connectable into a standard light socket or plug, and a second end having a rotatable/extendable mount with a camera mounted thereon. The body may also include a controller, a wireless communication module, lights, one or more optional sensors (such as a motion sensor, ambient light sensor, etc.), a back-up battery, a 2-way speaker, and/or a microphone.

20 Claims, 10 Drawing Sheets

(56) References Cited

U.S. PATENT DOCUMENTS

| | | | |
|---|---|---|---|
| 9,305,198 B2 | 4/2016 | Thompson et al. | |
| 9,654,678 B1* | 5/2017 | Fu | H04N 7/18 |
| 9,992,389 B1* | 6/2018 | Fu | G03B 11/045 |
| | | | 359/612 |
| 2003/0197807 A1 | 10/2003 | Wu | |
| 2012/0218421 A1* | 8/2012 | Chien | F21V 19/00 |
| | | | 348/207.1 |
| 2013/0169814 A1 | 7/2013 | Liu | |
| 2014/0313406 A1* | 10/2014 | Becker | H04N 5/2251 |
| | | | 348/374 |
| 2015/0249777 A1* | 9/2015 | Chen | H04N 5/2257 |
| | | | 348/151 |
| 2016/0100086 A1* | 4/2016 | Chien | H04N 5/2256 |
| | | | 348/143 |
| 2016/0134826 A1 | 5/2016 | Scalisi | |
| 2016/0134846 A1 | 5/2016 | Miller et al. | |
| 2017/0180829 A1* | 6/2017 | Schwarzkopf | H04Q 9/00 |
| 2017/0339343 A1* | 11/2017 | Zhang | H04N 5/23241 |

OTHER PUBLICATIONS

Editor, Taking photos through glass, At least as early as Jan. 3, 2012, DigicamHelp, http://digicamhelp.com/digicamhelp-downloads/digital-photography-ebooks/ (Year: 2012).*

May, Shooting through Glass, Sep. 17, 2013, Photography Tricks, http://photographytricks.com/author/maggie-may/ (Year: 2013).*

May, Maggie, Shooting Through Glass: 12 Tricks to Take Better Photos, Sep. 17, 2013, Photography Tricks, pp. 1-9 (Year: 2013).*

Clinton, Dan, Say No to Condiut! Try Telescoping Camera Poles for Pendant Mount CCTV Cameras, Mar. 11, 2015, Clinton Electronics, pp. 1-7 (Year: 2015).*

* cited by examiner

SECURITY CAMERA

BACKGROUND

1. The Field of the Invention

The present invention relates to a camera for use with security systems. More particularly, the present invention relates to a camera that can be powered with a light socket and combined with a light source.

2. State of the Art

There are many situations in which it is desirable to have a camera for viewing an area. Conventional security cameras are popular, and security cameras for the home are rapidly gaining popularity. In particular it is desirable to have cameras on the outside of a home to allow the user to observe potentially nefarious activities or to record information which may be used in tracking down thieves or vandals.

Such cameras can be expensive and/or difficult to install, however. Most camera systems require wiring from the camera to an interior location within the house. Often it will take an alarm technician an hour or more per camera to drill the appropriate holes to run wires from a camera to a control system. Doing so is expensive and can create undesired holes in a home.

Another persistent challenge with cameras is making sure the camera remains powered at all times. Batteries are used where electrical connection, such as the exterior of a home, is less feasible, but have to be changed often and do not have a back-up source of power. Some patents have suggested integrating a camera into a light bulb so that it may be placed into a light socket (for example, U.S. Pat. Nos. 9,305,198, 9,165,444, 9,053,622, D740873, D740873, and D749161). This avoids the need to provide separate power to a camera and can reduce the use of electrical lines. However, it is undesirable to leave a light on all of the time.

Thus, there is a need for a camera which can be used with a reliable power source that is simple and quick to install.

SUMMARY OF THE INVENTION

An improved security camera device is provided which is threadable into a light socket that is always left in a powered state. The device may integrate several other security features, such as light emitting diodes which may be programmed to emit light at certain times, speakers, WiFi/Bluetooth capabilities, etc.

According to one aspect, the camera is mounted on the device via an adjustable mount. The mount may be rotatable, and/or extendable, and may also include an extendable/tiltable slide.

According to another aspect, the camera may also be provided with a hood to protect the image from distortions, glare, etc.

According to yet another aspect, numerous other capabilities may be provided on the device. For example, a motion detector, an ambient light detector, a microphone, a speaker, and lights may be provided. Such capabilities may be controlled through a micro controller in communication with a wireless communication module.

According to another aspect, a method is provided to improve the security of a home using the security device described herein.

The objects, features and advantages of the present invention include providing a security camera that may (i) receive power from a socket of an outdoor light, (ii) provide a wireless connection to a computer network, (iii) be cost effective to implement and/or (iv) provide intelligent control to lights, speakers, etc.

BRIEF DESCRIPTION OF THE DRAWINGS

Various embodiments and features of a camera are shown and described in reference to the following numbered drawings.

Figure 1:
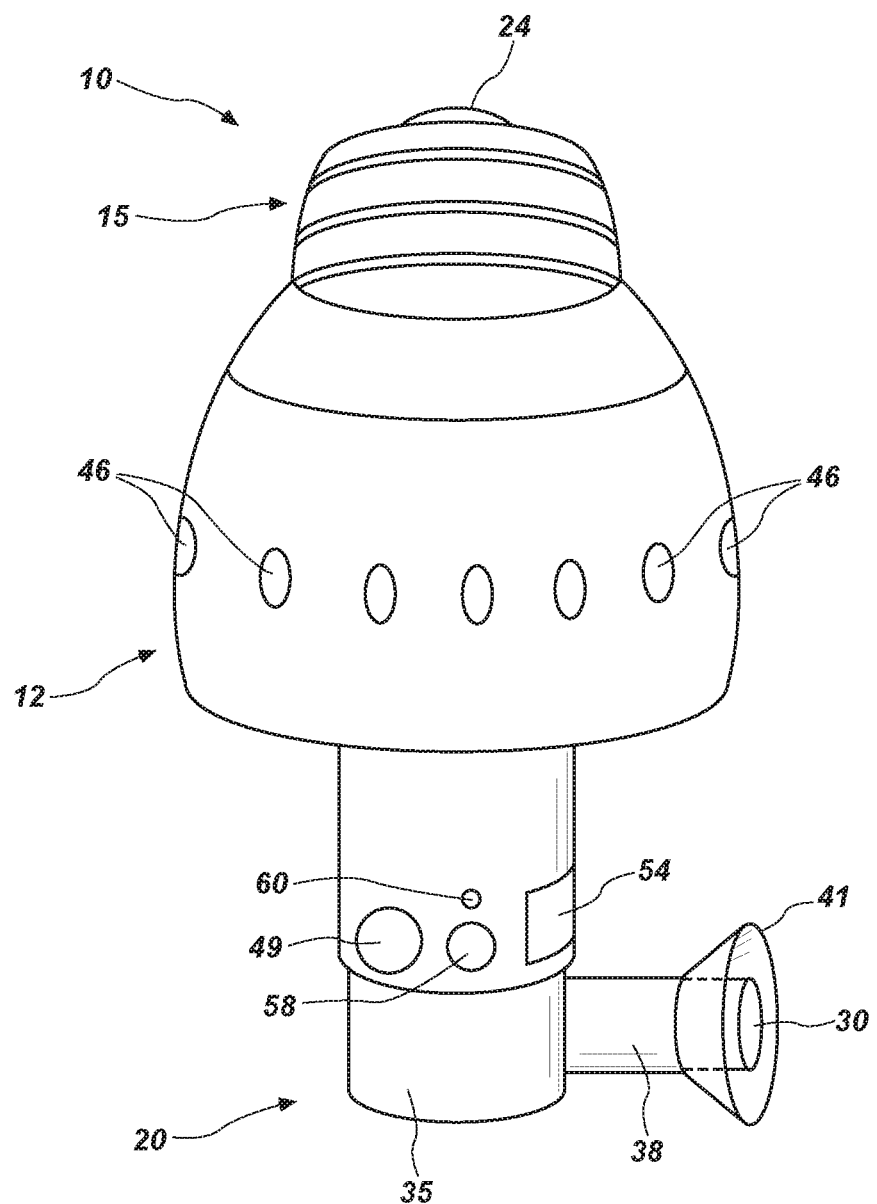
FIG. 1 shows a perspective view of one configuration of a security device.

It will be appreciated that the drawings are illustrative and not limiting of the scope of the invention which is defined by the appended claims. The embodiments shown accomplish various aspects of the invention. It is appreciated that it is not possible to clearly show each element and aspect of an invention in a single figure, and as such, multiple figures are presented to separately illustrate the various details of embodiments of camera security device in greater clarity. Several aspects from different figures may be used in accordance with security devices in a single structure. Similarly, not every embodiment need accomplish all advantages of various embodiments of a security camera device.

DETAILED DESCRIPTION

The invention and accompanying drawings will now be discussed in reference to the numerals provided therein so as to enable one skilled in the art to practice the present invention. The skilled artisan will understand, however, that the apparatuses, systems and methods described below can be practiced without employing these specific details, or that they can be used for purposes other than those described herein. Indeed, they can be modified and can be used in conjunction with products and techniques known to those of skill in the art in light of the present disclosure. The drawings and descriptions are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one configuration" "one embodiment," "a configuration" or "an embodiment" means that a particular feature, structure, or characteristic described in connection with the configuration is included in at least one configuration, but is not a requirement that such feature, structure or characteristic be present in any particular configuration unless expressly set forth in the claims as being present. The appearances of the phrase "in one configuration" in various places may not necessarily limit the inclusion of a particular element of the invention to a single configuration, rather the element may be included in other or all configurations discussed herein.

Furthermore, the described features, structures, or characteristics of configurations of the invention may be combined in any suitable manner in one or more configurations. In the following description, numerous specific details are provided, such as examples of products or manufacturing techniques that may be used, to provide a thorough understanding of configurations of the invention. One skilled in the relevant art will recognize, however, that configurations of the invention may be practiced without one or more of the specific details, or with other methods, components, materials, and so forth. In other instances, well-known structures, materials, or operations are not shown or described in detail to avoid obscuring aspects of the invention.

Before the present invention is disclosed and described in detail, it should be understood that the present disclosure is not limited to any particular structures, process steps, or materials discussed or disclosed herein, but is extended to include equivalents thereof as would be recognized by those of ordinarily skill in the relevant art. More specifically, the invention is defined by the terms set forth in the claims. It should also be understood that terminology contained herein is used for the purpose of describing particular aspects of the invention only and is not intended to limit the invention to the aspects or configurations shown unless expressly indicated as such. Likewise, the discussion of any particular aspect of the invention is not to be understood as a requirement that such aspect is required to be present apart from an express inclusion of the aspect in the claims.

It should also be noted that, as used in this specification and the appended claims, singular forms such as "a," "an," and "the" may include the plural unless the context clearly dictates otherwise. Thus, for example, reference to "a camera" may include one or more of such cameras, and reference to "the light" may include reference to one or more of such lights.

As used herein, the term "substantially" refers to the complete or nearly complete extent or degree of an action, characteristic, property, state, structure, item, or result to function as indicated. For example, an object, such as tubing, that is "substantially" enclosed would mean that the object is either completely enclosed or nearly completely enclosed. The exact allowable degree of deviation from absolute completeness may in some cases depend on the specific context, such that enclosing nearly all of the length of a piece of tubing would be substantially enclosed, even if the distal end of the structure enclosing the tubing had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it lacked a bottom.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Turning now to FIG. 1 there is shown a security camera and light device, generally indicated at 10, capable of being connected to a bulb socket. This makes it possible screw the device into a conventional bulb socket arrangement, such as a recessed lighting fixture, outdoor carriage light, etc. The security device 10 generally includes a body 12 with a first end 15 and a second end 20. The first end may include electrical contacts 24 sized and threaded to mimic a light bulb base so as to easily screw into an electrical socket. The electrical contacts 24 may operatively communicate with complementary contacts within an electrical socket to transmit standard AC power to the security device 10 for operation. Internally, the device 10 may include any desirable rectifier/power converter circuitry for reducing/converting the AC power current (for example, standard USB, 5 volts DC, 1 amp, or 2 amp) for operation of camera components, LEDs, etc., connected to the security device 10.

The second end 20 of the body may include a camera 30 mounted thereon. The camera 30 may be mounted to the second end 20 of the body 12 of the security device 10, for example, by way of a rotatable and/or extendable mount 35, with an optional slide 38 thereon to allow complete position adjustability of the camera 30. The camera 30 may also be provided with a hood 41. The body 12 of the security camera device 10 may also optionally include one or more lights 46 (such as LEDs, IR illuminators, etc.), a speaker 49, a motion detector 54, a microphone 58, an ambient light sensor 60, etc. Additionally, the body may house circuitry such as a power converter, a wireless networking module, and a rechargeable battery (not visible in FIG. 1).

Figure 2:
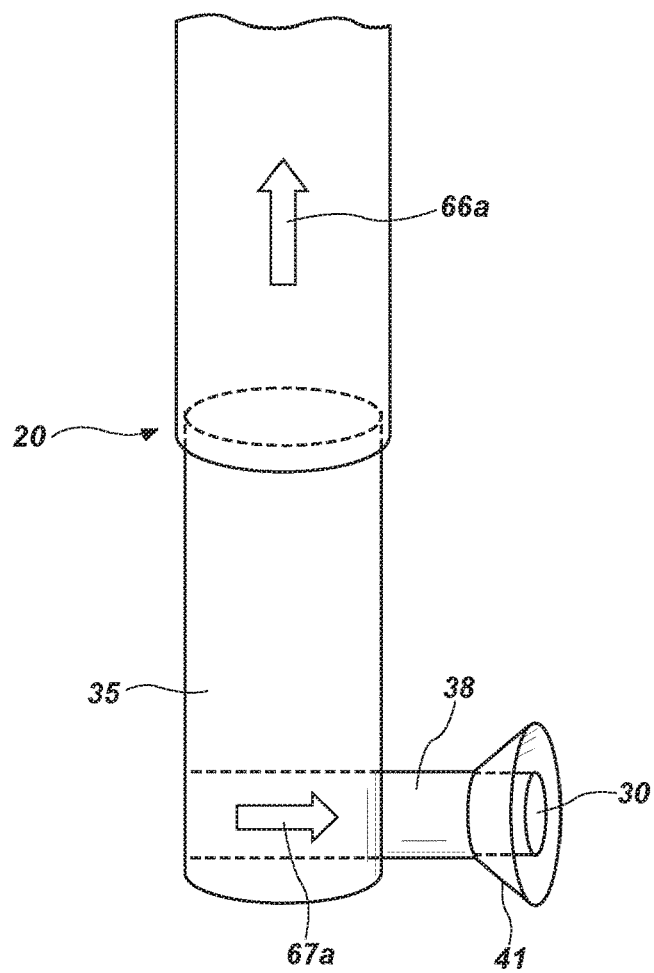
FIG. 2 shows a perspective view of the second end of the security device of FIG. 1 with the mount extended and slide retracted.
Figure 3:
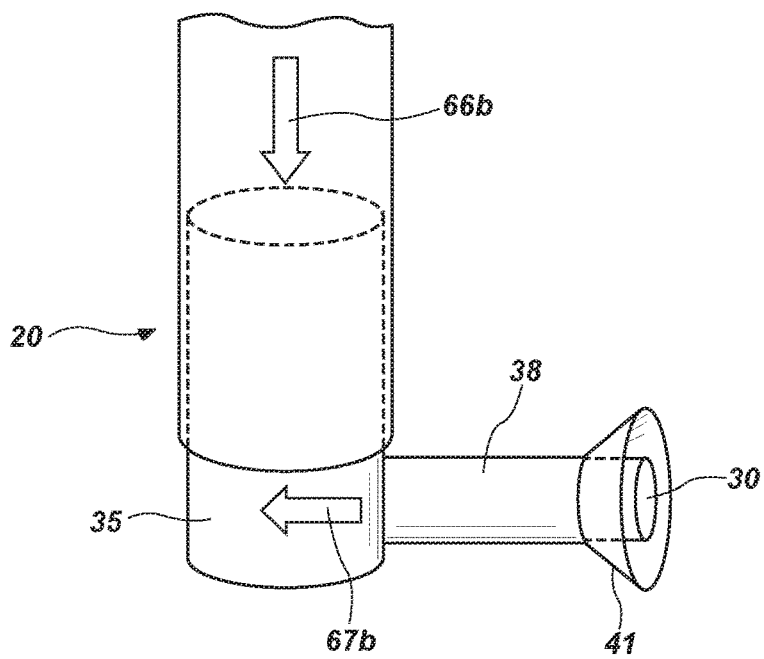
FIG. 3 shows a perspective view of the second end of the security device of FIG. 1 with the mount retracted and the slide extended.
Figure 4:
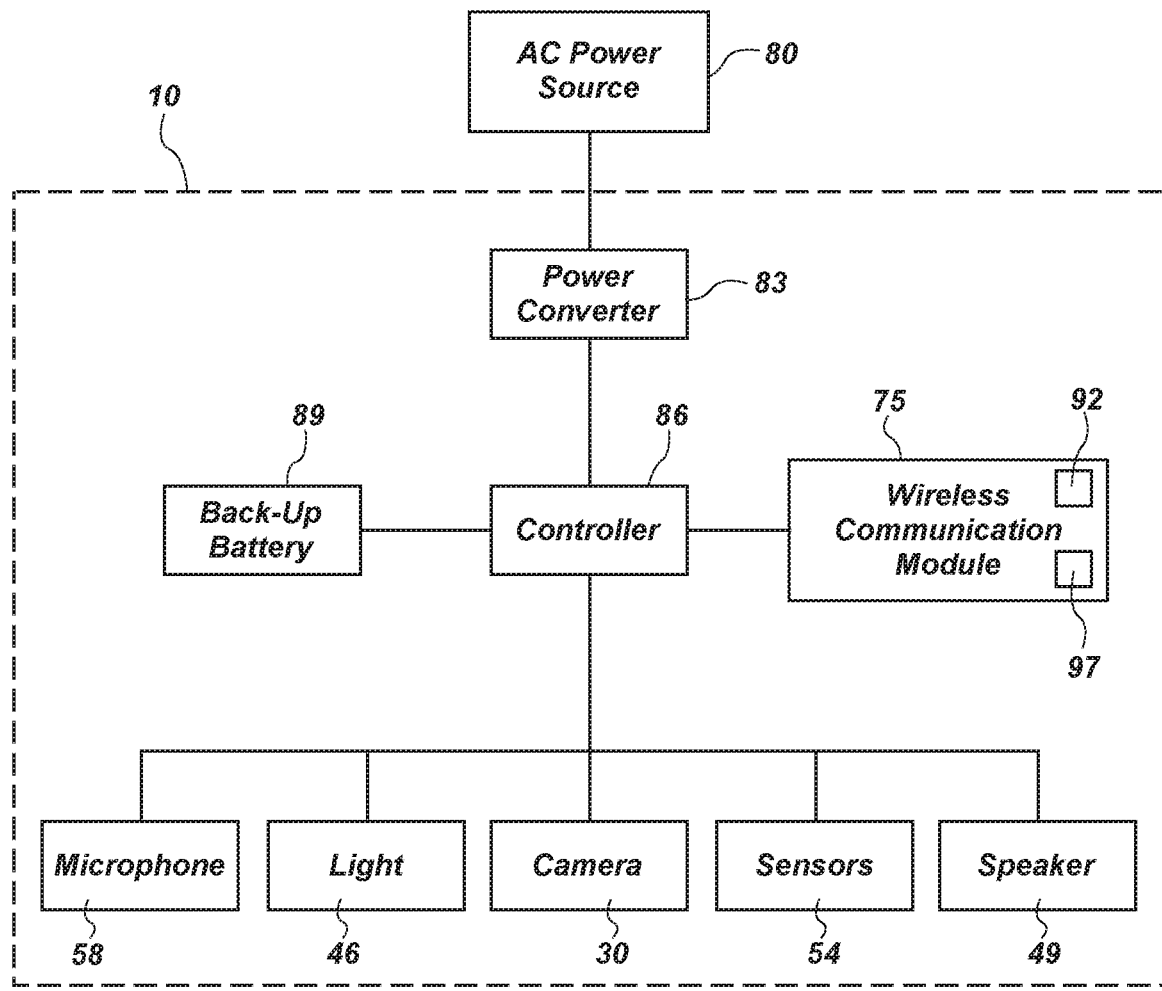
FIG. 4 shows a schematic of components that may be housed in the body of the security device in connection with an AC power source.

Turning now to FIGS. 2 and 3, there are shown perspective views of the second end 20 of the body of the security device 10. The second end 20 of the body may include a mount 35. The mount 35 may be extendable, and/or rotatable. For example, the mount 35 may be configured to telescope in the second end 20 of the body 12 of the security device 10 to be retracted, and out to be extended. FIG. 3 shows a partial cut-away view of the second end 20 of the security device 10, with the mount 35 in an extended position. The arrow 66a indicates the direction the mount may be slid to move inwardly. The slide 38 is shown in a retracted position and the arrow 67a indicates the direction the slide may be moved outwardly. FIG. 4 shows a perspective view of the second end 20 of the security device 10 with the mount 35 in a retracted position. The arrow 66b indicates the direction the mount 35 may be slid to extend the mount 35. The slide 38 is shown in an extended position, and the arrow 67b indicates the direction the slide may be retracted. Such an extension may allow users to place the camera at the desired height and position, depending on the height of the light socket and/or light fixture the camera will be used in conjunction with. The mount 35 may also be rotatable, such that a user may rotate the mount to place the camera at the desired rotational position.

Similarly, the mount 35 may be connected to a slide 38. The slide 38 may also be extendable and/or have tilt functionality. A tilt function may allow the user to angle the camera to a desired orientation and have further control of the view of the camera. The camera 30 may be mounted to the rotatable mount 35 by the slide 38, for example, or the end of the mount 35 if no slide is provided. With a rotatable/extendable mount 35 and/or slide 38, the camera 30 may have complete manual (or automated, if gimbal motors are provided) position adjustability. Such adjustability may allow a user to place the camera 30 directly against the glass of a lighting fixture, for example, such as an outdoor carriage lamp that is common to many homes. The camera may be advanced to be pressed directly against the glass, which may reduce or eliminate problems such as glare. If, for example, the light is disposed inside a carriage lamp along the exterior of a home, the glass of the carriage may distort the image. By advancing the camera against the glass, the distortion may be decreased.

The camera may also be provided with a hood 41. The hood 41 may extend around the camera 30 and lens 30a and press against a glass light fixture, for example. This extended hood may be designed to directly contact the glass/plastic of a lantern or sconce light fixture, for example. Such a hood 41 may further reduce persistent problems such as glare, or other interference from the light 46 of the security device 10 or other surrounding lights. For example, if the security device is provided with its own LEDs and/or IR illumination, the lighting and/or sensors may decrease the visibility of the camera. By isolating the camera with a hood, visibility and picture quality may be increased. Providing a hood to reduce glare and improve the quality of the camera picture may also allow the camera to be used more discreetly outdoors, such as in an existing light fixture. Such a light fixture may have an added benefit of offering some protection from the outdoor elements for the security device. The hood may be formed of any appropriate material, such as rubber, plastic, etc.

Any type of suitable camera 30 desired may be used in conjunction with the security device. For example, a camera that utilizes a fish-eye lens capable of capturing a 180 degree peripheral view may be used. Wide-angle lenses or other lenses may be used. In some configurations, multiple cameras 30 may be used in conjunction to obtain a 360 degree view. The camera 30 may include standard features known in the industry, such as night vision, high definition, wireless capability, cloud storage for data, etc. The particular camera features implemented in the lens and/or circuitry may be varied to meet the design criteria of any particular implementation.

The body 12 of the security device may also be provided with one or more lights 46. Any suitable type of light may be used. For example, LEDs may be used to conserve energy, or standard bulbs may be used, or infrared illuminators, or a combination of such types of lights may be used. In some configurations, lighting may be incorporated into single silicone strips on the security device. Such lights can serve numerous functions. For example, the light may provide sufficient lighting of the observation area, to enable good image quality for the camera. The light(s) 46 can also serve a safety purpose to light the front of a home. In some configurations, the light source is connected to a controller that may control the functionality of the lights. The controller may be connected to other functionalities, such as sensors, detectors, and/or a wireless module (see discussion of wireless module below) on the security device. For example, the lights 46 may be motion-activated, and programmed to turn on when a motion detector 54 on the body of the device senses motion. Similarly, the body of the device may be provided with an ambient light sensor 60, and the lights may be programmed to automatically turn on and stay on when ambient light is low. (It will be appreciated that a separate motion detector 54 and ambient light sensor 60 may be provided, or a sensor with integrated motion and ambient light detecting capabilities may be provided.)

The controller may also control for the intensity and/or color of the lights. For example, if a home owner views the camera picture and determines there is an intruder on their porch, they may send a signal to the controller, via the wireless module, to have the lights flash quickly in an intense, bright white color. This may alert the intruder that their presence is known, and also call attention to the intruder if anyone passes by the home. It will be appreciated that many various controls and configurations for the light may be possible, depending on the design criteria desired and are contemplated herein.

Turning now to FIG. 4, there is shown a schematic of a security device 10 described herein used in conjunction with a source of alternating current, indicated at 80. The AC power source 80 may be connected to a power converter 83 to convert the AC power to direct current (DC) power to provide power to the circuitry of the security device, as well as a back-up battery 89. Additionally, as described above, the security device may house a controller 86. The controller may include, for example, storage, a processor, etc. The controller 86 may be used to communicate commands from a wireless communication module 75 to the components of the security device.

The wireless module may include, for example, a wireless transmitter 92 and a wireless receiver 97. Any suitable wireless protocol may be used, such as a WiFi antenna, Z-wave, Zigbee, IR, Bluetooth, or any other suitable wireless or cellular technology. The wireless communication module 75 may be configured to connect and send data to a local network and/or a mobile handheld device through a wireless connection. Such data may be communicated, for example, to a wireless router, a central alarm system, and/or a remote web interface or application (see FIG. 5, below). The wireless transmitter 92 may provide for transmitting images and data from the camera to a computer network, such as local hard drive, or a remote cloud computing drive, or both. The wireless receiver 97 may allow for receiving signals via the network for operation and control of the camera, e.g., positioning commands for one or more gimbal motors, and/or focusing commands for the camera 30, commands for lights 46, and other sensors provided on the security device 10.

The controller 86 may be operatively electrically connected to coordinate operation of the other components of the security device. For example, the controller 86 may communicate video data from the camera 30 to the wireless communication module 75 to then be transmitted by the wireless transmitter 92. The controller 86 may also communicate audio data between the microphone 58, the wireless communication module 75, and the speaker 49. The controller may further communicate positioning commands received at the wireless communication module 75 to any camera gimbal motors. The light 46 may also be operated through the controller, such as for example, by an event being sensed by the motion sensor 54, and triggering the light 46. Similarly, the light, camera, speaker, etc. may be controlled manually by users with access to the images and/or sounds from the camera 30 via the wireless communication module 75.

The wireless communication module 75 and controller 86 may utilize standard components known to one of ordinary skill in the art in connection with wireless transmission of signals and control of circuitry. In general, the wireless transmitter/receiver 122, 124 can communicate with a wireless router or a wireless hotspot within an operating range. Once connected to a network, for example, via a home computer, signals can be transmitted for real-time viewing, or recorded and stored, as desired. In some configurations, multiple devices, such as multiple smart phones, can be connected to the system for viewing or control purposes.

Figure 5:
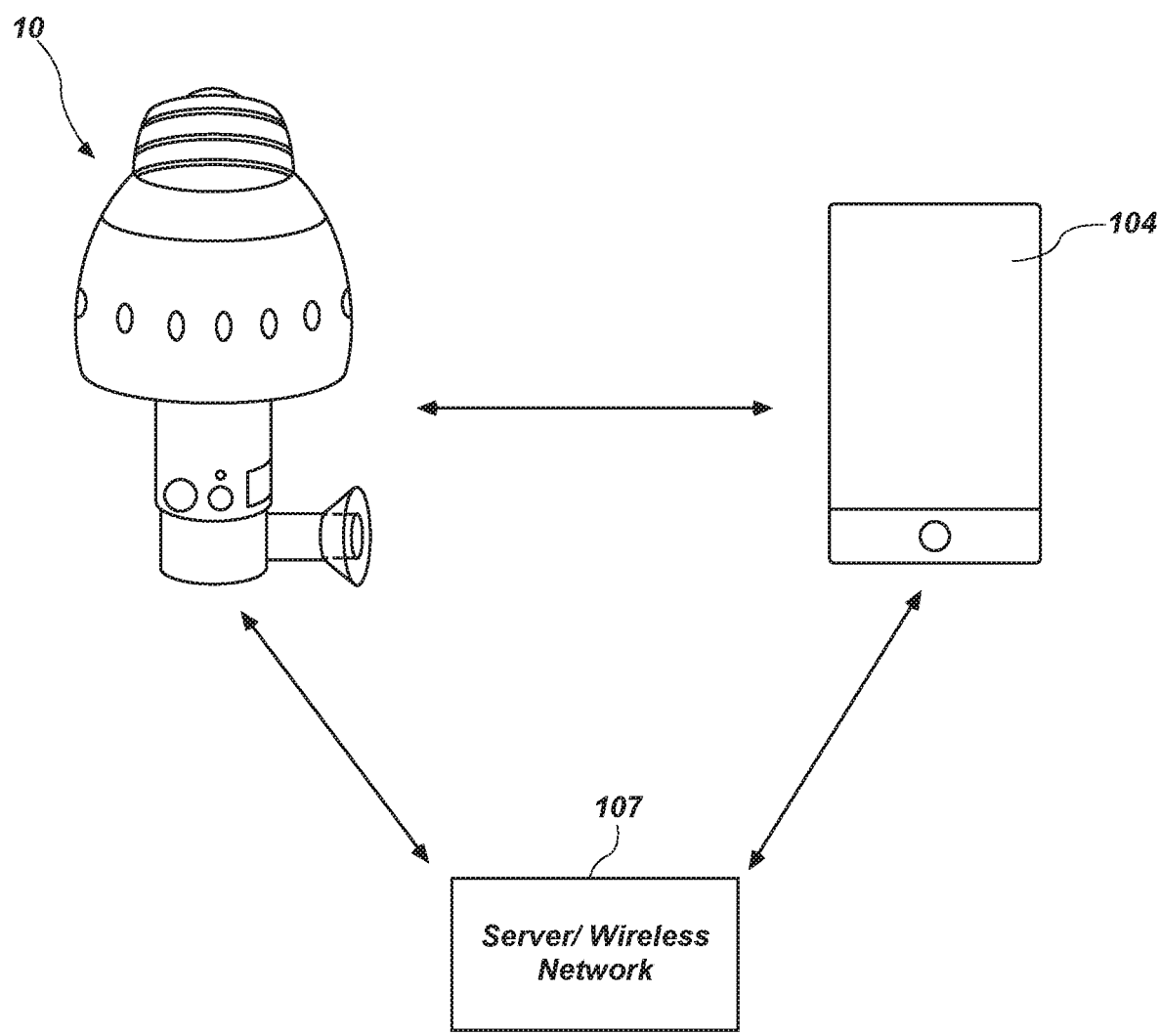
FIG. 5 shows a schematic of the security device in wireless communication with a computing device and wireless network.

A web interface may provide the user with access to a system dashboard and home control via an iOS or Android smartphone or other Internet-enabled device. FIG. 5 shows a schematic of a security device 10 communicating wirelessly with a computer device 104 and a server/wireless network 107. Video and other system data may be stored in the cloud, reducing hardware costs for the user and providing easy, reliable retrieval of information. A smartphone or tablet application may control the security device 10 remotely.

Many types of software may be used in conjunction with the security device described herein. For example, facial recognition software may be used. In this example, the facial recognition software may be used to identify friendly people and/or animals from unfriendly people and/or animals. Friendly people may trigger certain sounds and/or lights, while unfriendly people may trigger other sounds and/or lights.

The security device 10 may be provided with multiple additional functionalities. For example, the security device 10 may be provided with a speaker. The speaker may be one-way to allow a user to hear and record sound, or may be 2-way, to play a sound. For example, the speaker may be programmed to play a message when the motion detector senses motion. Or the speaker may allow a home owner to send their voice live to an intruder to warn them that their presence is known. In this example, a home owner may receive an alert on their computing device that motion has been detected. The home owner may then view the camera picture live, and determine if the visitor is an intruder. If the visitor is an intruder, the home owner may use the speaker to tell the intruder to go away. Similarly, the home owner may cause one or more lights 46 to flash and alert the intruder, or the speaker may play a loud warning alarm.

A battery may also be provided within the body 12 of the security device 10. Such a battery may be, for example, rechargeable and may automatically re-charge via power from the AC power source. This battery may allow full functionality of the security device when there is a power outage from the AC power source.

Figure 6:
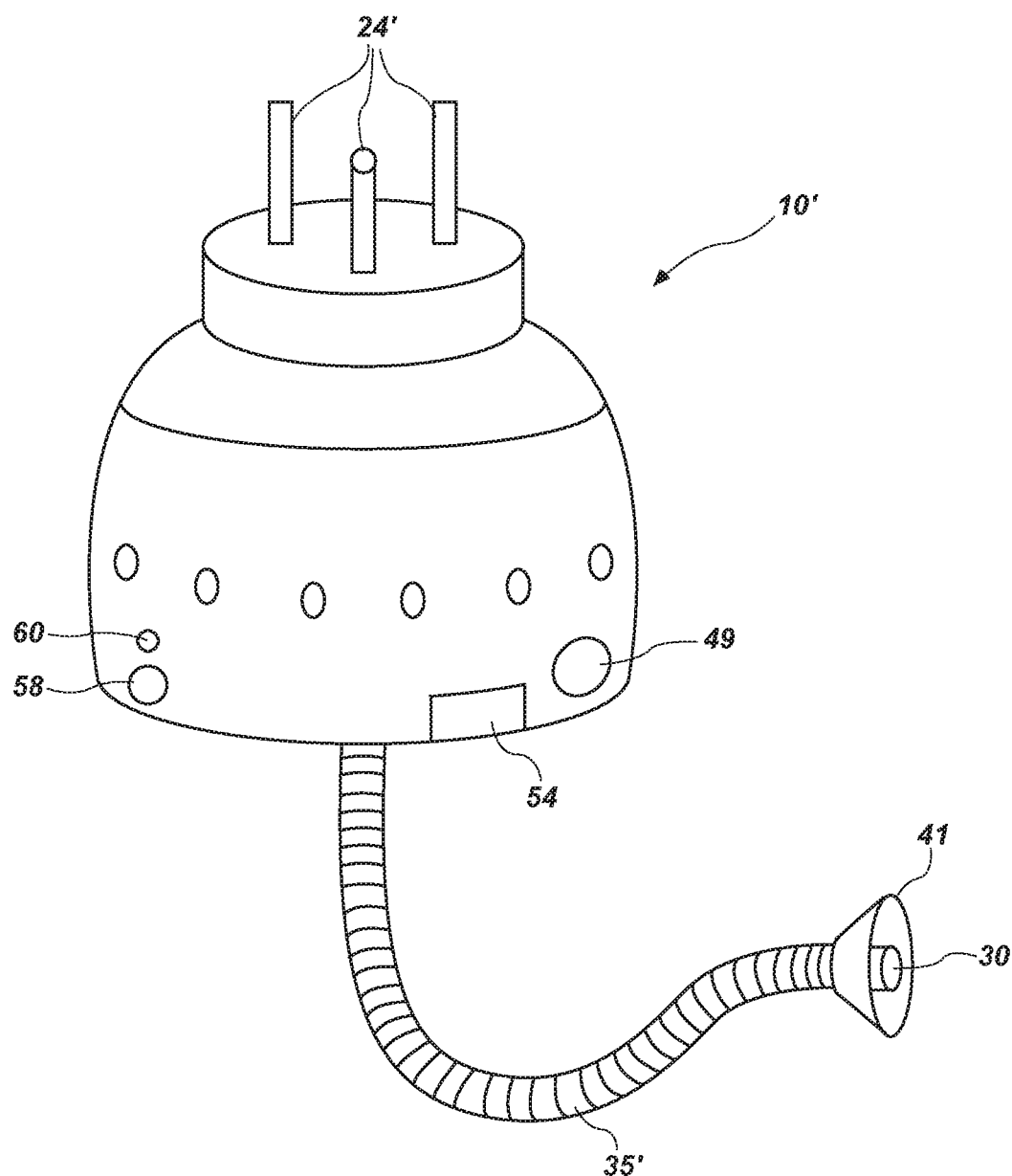
FIG. 6 shows a perspective view of an alternate configuration of a security device.

Numerous configurations of the security device are possible, with different positioning of the components, lights, camera, etc. Turning to FIG. 6, there is shown an alternate configuration of the security device, generally indicated at 10'. The electrical contacts 24', rather than being configured for connection into a conventional light socket, may be fitted for electrical contact into a standard, 3-prong outdoor plug. Thus, if a light socket is not available, a plug may be used. The arrangement of the components, such as the motion sensor 54 and speaker 49, may be at varying locations on the body of the device. This configuration also shows a mount 35' as a bendable, adjustable arm with a camera 30 and a hood 41.

It will be appreciated that many types of configurations of the security device are possible and contemplated herein. For example, one or more cameras may be provided within the security camera device if it is desired to view not just 180 degrees, but rather 360 degrees, a mount may be provided at the second end of the body, the mount having two slides disposed opposite one another, each slide having a camera mounted to the end thereof and each camera having a hood. Or the security device many be provided with one or more mounts that comprise bendable arms. Other similar variations exist using as many cameras as may be desired for the particular needs and circumstances. Similarly, configurations with one or more speakers, more or more lights, more or more microphones, etc. are possible.

One with skill in the art will recognize many advantages in the present security device. Such a device saves a significant amount of professional installation time, typically 4-5 hours, as well as the expense and the potential holes that may be permanently made in the home for wiring. The system may be fully integratable into a current alarm system. The additional option functionalities of the device may allow it to operate, for example, as a speaker for playing music, or as a means for providing automated control over the exterior lights provided on the device.

Figure 7:
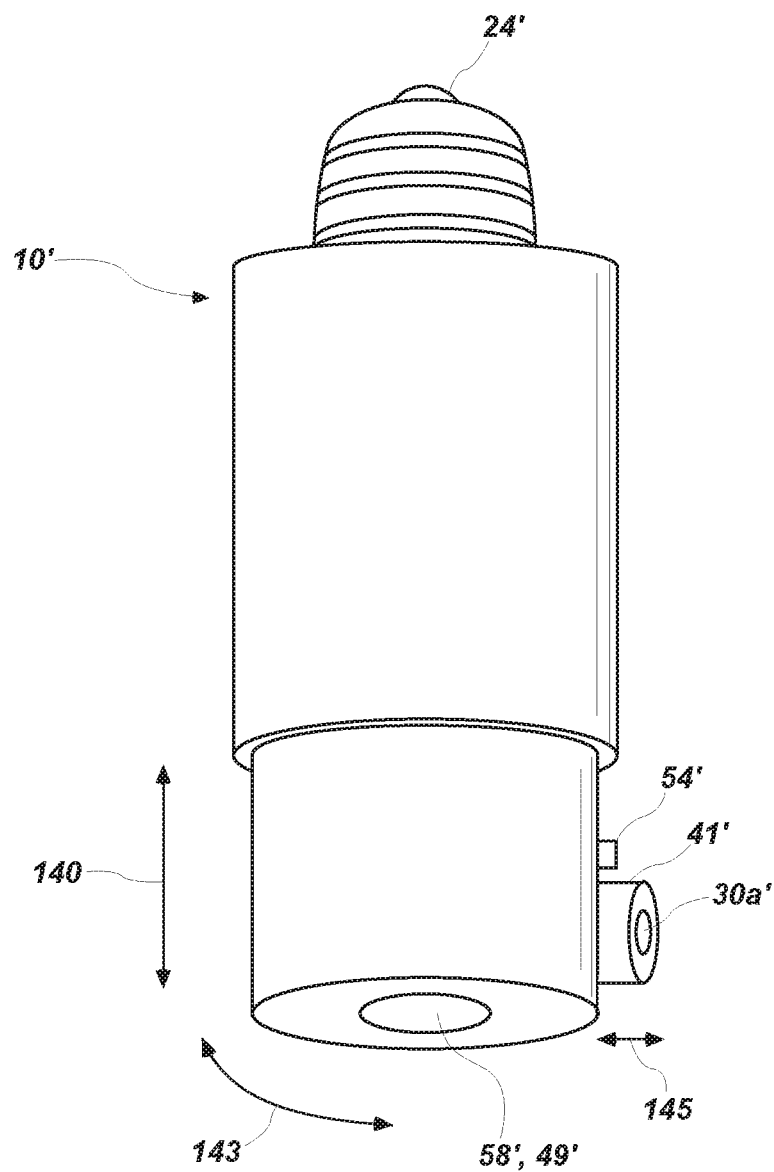
FIG. 7 shows a perspective view of another alternate configuration of a security device.
Figure 8:
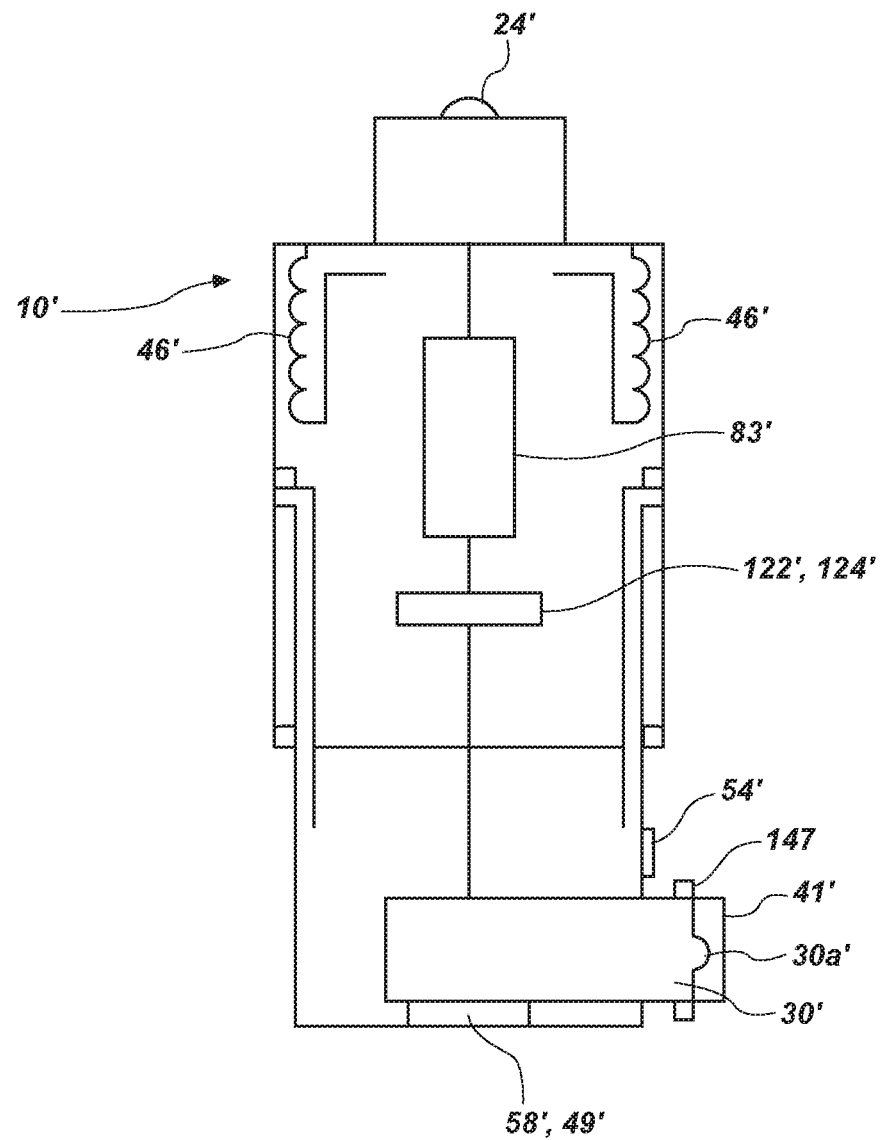
FIG. 8 shows a cut-away view of the security device of FIG. 7.

Turning now to FIGS. 7 and 8, there is shown another configuration of a security camera and light device, generally indicated at 10', capable of being connected to a bulb socket. FIG. 7 shows a perspective view, and FIG. 8 shows a partially cut-away view, showing some of the interior components of the security device 10'. As can be seen by arrow 140, the second end of the device may be adjusted to change the height of the camera. Arrow 143 shows how the second end of the device may be rotated 360 degrees for proper positioning of the camera. Similarly, arrow 145 shows how the camera may be adjusted internally/externally for precise positioning. A hood 41' is provided to surround the lens 30a of the camera 30. A combination speaker/microphone, 58', 49', may be provided on the second end of the device. Similarly, a motion sensor 54' may be provided.

Internally, the device' 10 may include any desirable rectifier/power converter circuitry 83' for reducing/converting the AC power current (for example, standard USB, 5 volts DC, 1 amp, or 2 amp) for operation of camera components, LEDs, etc., connected to the security device 10'. A wireless transmitter/receiver 122', 124' may also be provided internally. The camera 30 may be additionally equipped with a wide-angle lens 30*a*' and/or infrared capabilities 147. In this configuration, the lights 46' may be provided internally, and the upper portion of the housing may be partially translucent or semi-transparent. In some configurations, the device may contain a repeater that will allow for the repeating and boosting of WiFi, Z-Wave, Zigbee, or cellular signals or the like.

The second end 20 of the body may include a camera 30 mounted thereon. The camera 30 may be mounted to the second end 20 of the body 12 of the security device 10, for example, by way of a rotatable and/or extendable mount 35, with an optional slide 38 thereon to allow complete position adjustability of the camera 30. The camera 30 may also be provided with a hood 41. The body 12 of the security camera device 10 may also optionally include one or more lights 46 (such as LEDs, IR illuminators, etc.), a speaker 49, a motion detector 54, a microphone 58, an ambient light sensor 60, etc. Additionally, the body may house circuitry such as a power converter, a wireless networking module, and a rechargeable battery (not visible in FIG. 1).

Figure 11:
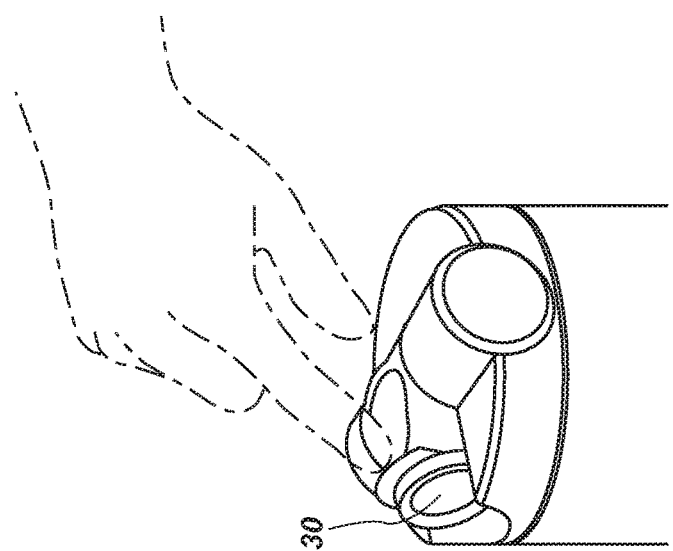
FIG. 11 shows a perspective view of the bottom of a security device as the camera may be adjusted.
Figure 10:
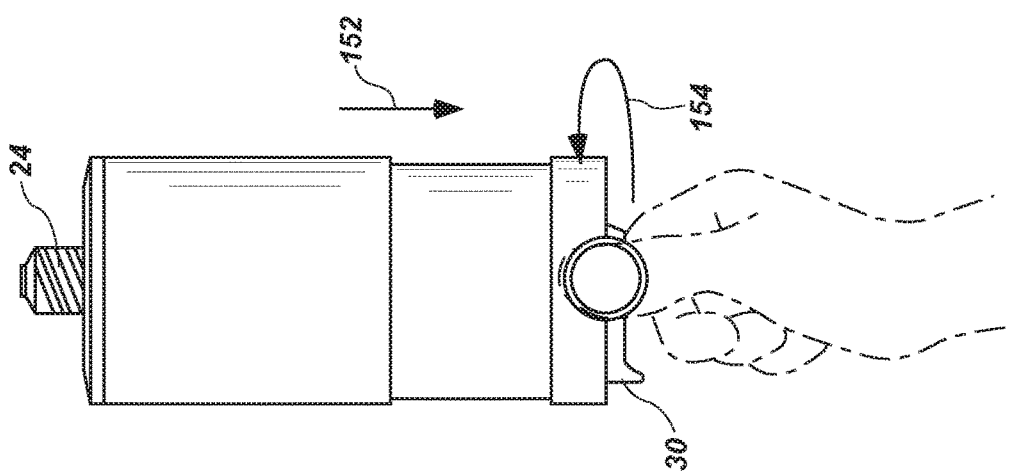
FIG. 10 shows a front view of the security device as it may be slidably and rotatably adjusted.
Figure 9:
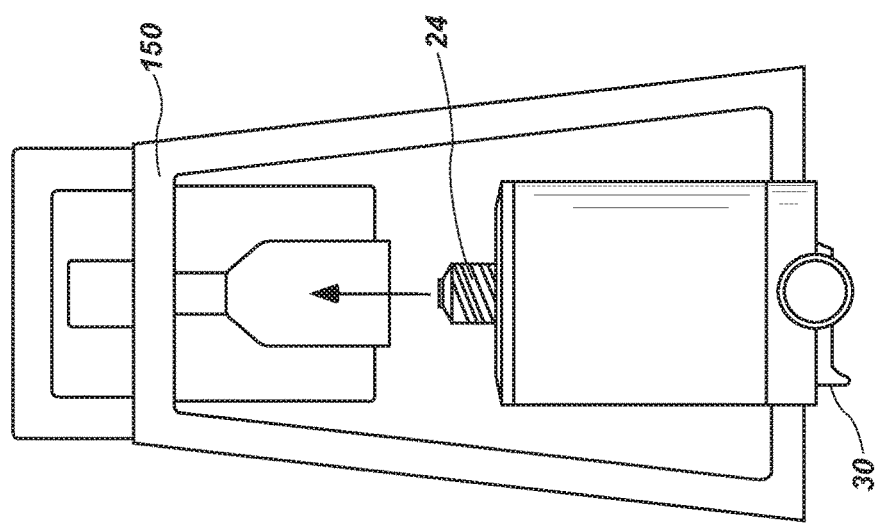
FIG. 9 shows a front view of a security device being installed into a light fixture.
Figure 12:
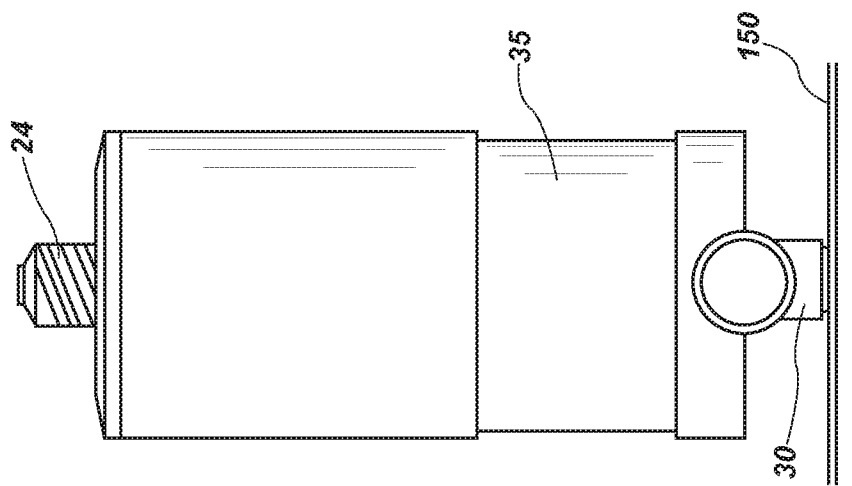
FIG. 12 shows a side view of the security device with the camera pressed against a side of a light fixture.
Figure 13:
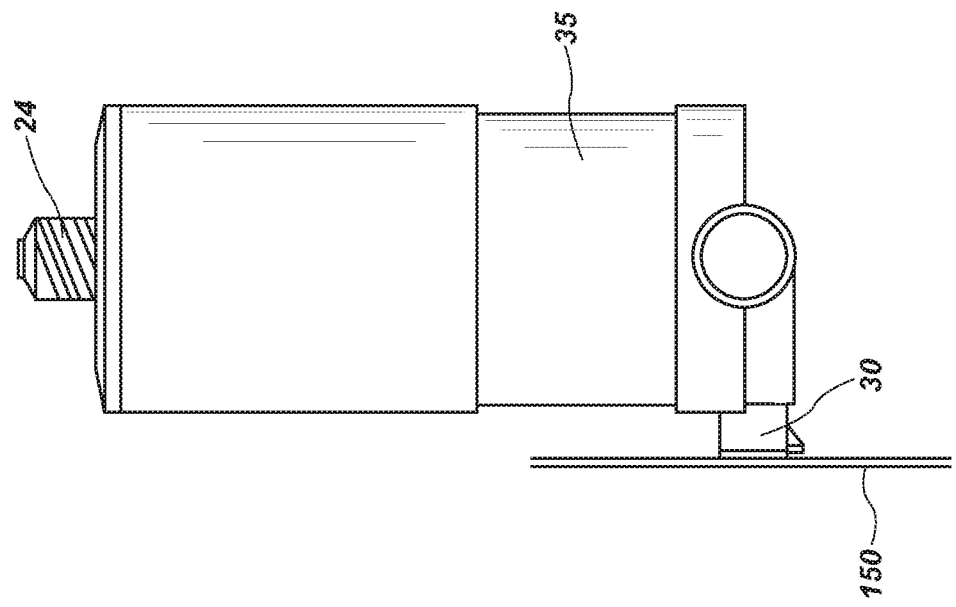
FIG. 13 shows a side view of the security device with the camera pressed against a bottom of a light fixture.

Turning now to FIGS. 9 through 13, there is shown a method of using one configuration of the security device 10 as described herein in conjunction with a light fixture 150. A user may first thread the electrical contact 24 into the socket of the light fixture 150. A user may then extend the extendable mount 35 on the body 12 of the device 10 in the direction of arrow 152 and rotate the camera 30 in the direction of arrow 154 to the desired position. As seen in FIG. 11, the camera 30 may then be pushed outwardly to extend to the glass of the light fixture 150. As seen in FIG. 12, the camera 30 can extend to the glass of the light fixture 150 at 90 degrees. FIG. 13 shows the camera 30 extended to the glass of the light fixture 150 in a vertical orientation.

Figure 15:
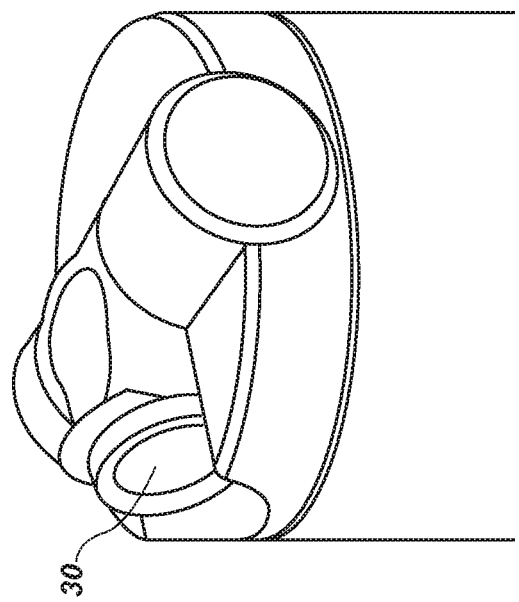
FIG. 15 shows a bottom perspective view of a security device with the LED illuminated to obscure the camera.
Figure 14:
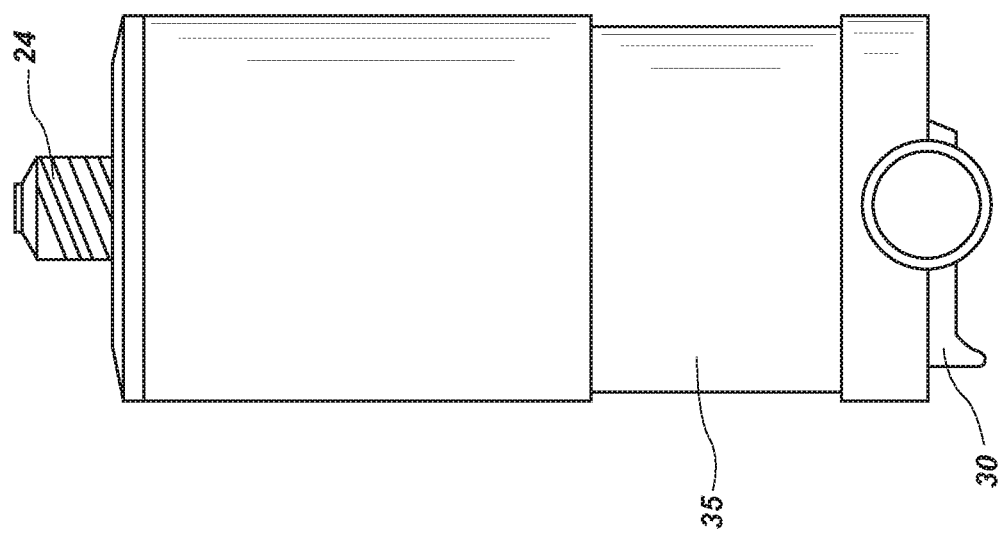
FIG. 14 shows a front view of a security device with the LED illuminated.

As can be seen in FIGS. 14 and 15, the LED lighting may illuminate all sides of the light fixture for even lighting, and enable concealment of the camera 30.

Described herein is a security device comprising: a body comprising a first end and a second end, the first end being threadable into a light socket, and the second end having a rotatable mount disposed thereon, a slide connected to the mount, a camera with a lens disposed on the slide, and a hood surrounding the lens of the camera; a wireless communication module disposed in the body; a light disposed on the body of the security device, wherein the light, the wireless communication module, and the camera are electrically connected to the first end.

In some configurations, the mount is extendable. The device may further comprise a controller in communication with the wireless communication module, camera, and light. The device may also comprise a motion detector. The light may include a plurality of lights, and the plurality of lights may be LEDs and/or infrared illuminator(s). The device may further comprise a microphone disposed on the body and in electrical connection with the first end. The device may further comprise a speaker disposed on the body and in electrical connection with the first end.

The device may include power converter circuitry housed in the body and electrically connected with the first end. The device may also include a controller electrically connected to the power converter circuitry, camera, and light. A battery electrically connected to the controller may be provided.

Described herein is a security camera device comprising: a body having a first end and a second end, the first end having an electrical contact for input of electricity; a controller electrically connected to the first end; a wireless module; an adjustable mount disposed on the second end, and a camera having a lens disposed on the mount; one or more lights disposed on the body; wherein the wireless module, camera, and one or more lights are in communication with the controller. The camera may optionally include an infrared camera.

The device may include a hood surrounding the lens of the camera. The device may further comprise a motion sensor in communication with the controller, and/or a microphone and speaker in communication with the controller. One or more of the lights may comprise at least one LED.

Also described herein is a method of providing security to a building, the method comprising: selecting an outdoor light socket on the exterior of the building; selecting a security device, the security device comprising a body having a first end and a second end, the first end having an electrical connection threadable into a standard light socket; the second end having a rotatable mount disposed thereon, an extendable slide connected to the mount, a camera having a lens disposed on the slide, and a hood surrounding the lens; a wireless communication module disposed in the body; a light disposed on the body of the security device, wherein the light, the wireless module, and the camera are electrically connected to the first end; threading the first end of the security device into the outdoor light socket; and adjusting one or more of the mount and the slide to place the camera.

The exterior of the building may include a light fixture disposed around the outdoor light socket, and the step of adjusting one or more of the mount and the slide to place the camera includes adjusting such that the camera is pressed against an inside surface of the light fixture.

Thus there is disclosed a new security camera device. Those skilled in the art will appreciate numerous variations which may be made without departing from the scope and spirit of the invention. The appended claims are intended to cover such modifications.

What is claimed is:

1. A security device comprising:
   a body comprising a first end and a second end, the first end being threadable into a light socket, and the second end having a rotatable mount disposed thereon, a rigid slide connected to the mount, a camera with a lens disposed on the slide, and a hood surrounding the lens of the camera, wherein the slide is extendable and tiltable such that the slide is configured to extend at an angle away from a longitudinal axis of the body to engage a material of a light fixture;
   a wireless communication module disposed in the body; and
   a light disposed on the body of the security device, wherein the light, the wireless communication module, and the camera are electrically connected to the first end.

2. The security device of claim 1, wherein the mount is extendable.

3. The security device of claim 1, further comprising a controller in communication with the wireless communication module, camera, and light.

4. The security device of claim 1, further comprising a motion detector.

5. The security device of claim 1, wherein the light includes a plurality of lights, and wherein the plurality of lights are LEDs.

6. The security device of claim 1, wherein the light includes a plurality of lights, and wherein one or more of the plurality of lights is an infrared illuminator.

7. The security device of claim 1, further comprising a microphone disposed on the body and in electrical connection with the first end.

8. The security device of claim 1, further comprising a speaker disposed on the body and in electrical connection with the first end.

9. The security device of claim 1, further comprising power converter circuitry housed in the body and electrically connected with the first end.

10. The security device of claim 9, further comprising a controller electrically connected to the power converter circuitry, camera, and light.

11. The security device of claim 10, further comprising a battery electrically connected to the controller.

12. The security device of claim 1, further comprising an infrared camera.

13. The security device of claim 1, further comprising a motion sensor, wherein when the motion sensor senses a person, the light flashes.

14. A security camera device comprising:
a body having a first end and a second end, the first end having an electrical contact for input of electricity;
a controller electrically connected to the first end;
a wireless module;
an adjustable mount disposed on the second end, and a camera having a lens disposed on the mount;
one or more lights disposed on the body, wherein one or more of the plurality of lights is an infrared illuminator; and
a hood entirely surrounding the lens of the camera, wherein the hood is configured to press against a transparent material of a light fixture and block the infrared light produced by the infrared illuminator,
wherein the wireless module, camera, and one or more lights are in communication with the controller.

15. The security camera device of claim 14, further comprising a motion sensor in communication with the controller.

16. The security camera device of claim 14, further comprising a microphone and speaker in communication with the controller.

17. The security camera device of claim 14, wherein the adjustable mount comprises a rotatable mount.

18. A security camera device system comprising:
a light fixture; and
the security camera device of claim 14, wherein the hood is configured to press against a transparent material of the light fixture.

19. A method of providing security to a building; the method comprising:
installing a security device in an outdoor light socket on the exterior of the building, the security device comprising:
a body having a first end and a second end, the first end having an electrical connection threadable into a standard light socket;
the second end having a rotatable mount disposed thereon, an extendable rigid slide connected to the mount, a camera having a lens disposed on the slide, and a hood surrounding the lens, wherein the slide is extendable and tiltable such that the slide is configured to extend at an angle away from a longitudinal axis of the body to engage a material of a light fixture;
a wireless communication module disposed in the body; and
a light disposed on the body of the security device, wherein the light, the wireless module, and the camera are electrically connected to the first end;
positioning the second end of the security device to direct a view of the camera; and
adjusting one or more of the mount and the slide to place the camera.

20. The method of claim 19, wherein the exterior of the building includes a light fixture disposed around the outdoor light socket, and the step of adjusting one or more of the mount and the slide to place the camera includes adjusting such that the camera is pressed against an inside surface of the light fixture.

* * * * *